June 12, 1956 L. E. RENTON 2,750,445
RECORDING MECHANISM FOR TELEPHONE SYSTEMS
Filed July 14, 1950 2 Sheets-Sheet 1

INVENTOR
*Lawrence E. Renton*
BY *Ralph B. Burch*
ATTORNEY

June 12, 1956 L. E. RENTON 2,750,445

RECORDING MECHANISM FOR TELEPHONE SYSTEMS

Filed July 14, 1950 2 Sheets-Sheet 2

INVENTOR
Lawrence E. Renton

BY Ralph Burch
ATTORNEY

United States Patent Office 2,750,445
Patented June 12, 1956

2,750,445

RECORDING MECHANISM FOR TELEPHONE SYSTEMS

Lawrence Ernest Renton, Vancouver, British Columbia, Canada

Application July 14, 1950, Serial No. 173,909

7 Claims. (Cl. 178—23)

This invention relates to communication systems for sending and receiving printed messages.

More specifically, this invention relates to improvements over existing systems of communication for sending and receiving printed messages.

As applied to conventional communication systems the sending and receiving instrument as conceived is designed for simplicity of operation, economy in construction, practicability of use by unskilled operators, and is capable of utilizing conventional means of established communication lines by interconnection therewith.

By this conception and design, the invention as disclosed herewith portrays a spirit of practical improvement over known mechanisms of like nature, and in the progress of this disclosure many pertinent objects and improvements will become obvious to those skilled in the required art.

Of particular note in examining this invention is the object of automatic response by the receiving printer mechanism and the subsequent documentation of messages in the absence of an attendant to the receiving mechanism.

Having due regard for the specific features of the invention, the following description is put forward in substantiation of the attendant claims without undue reference to things of a conventional nature.

Figure 1:
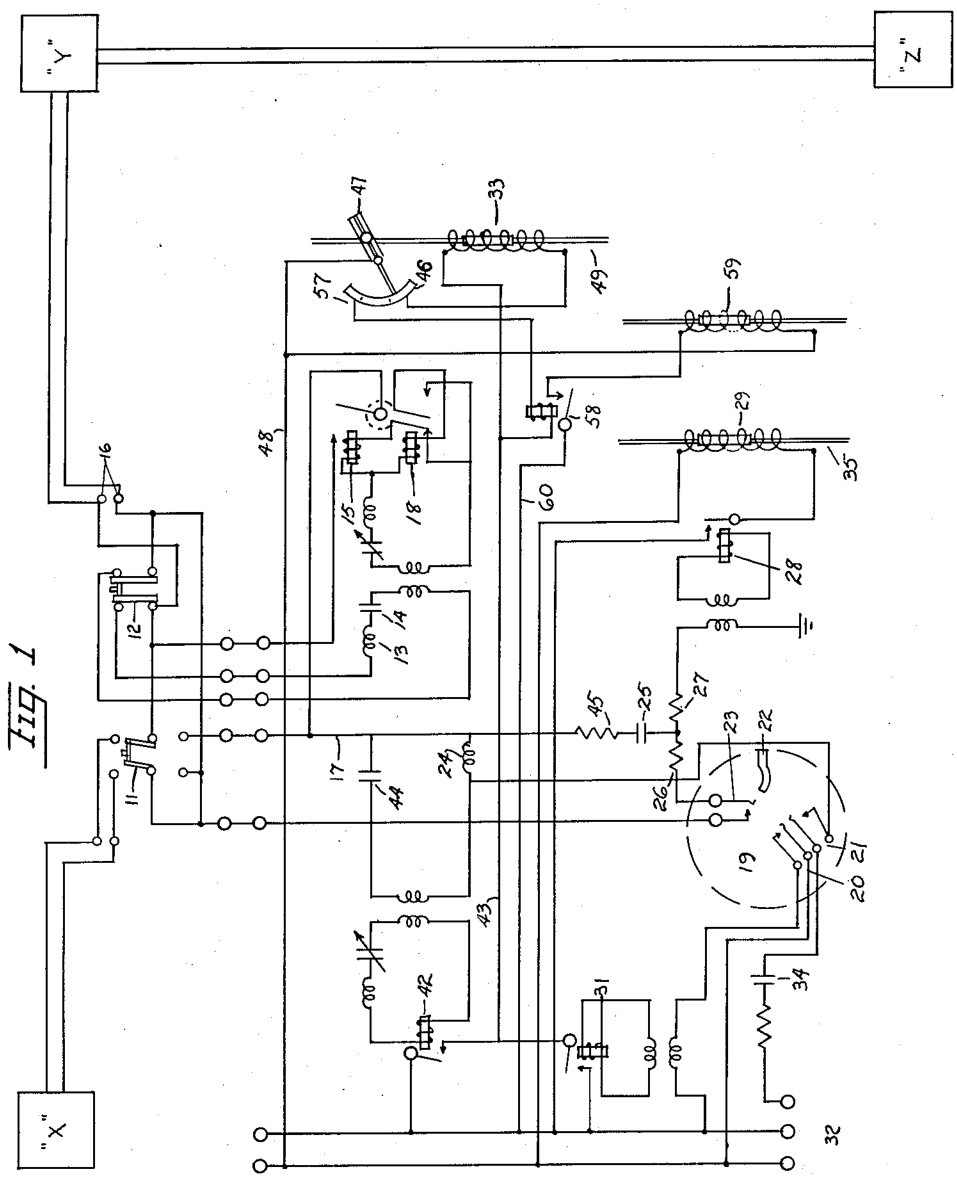
Figure 2:
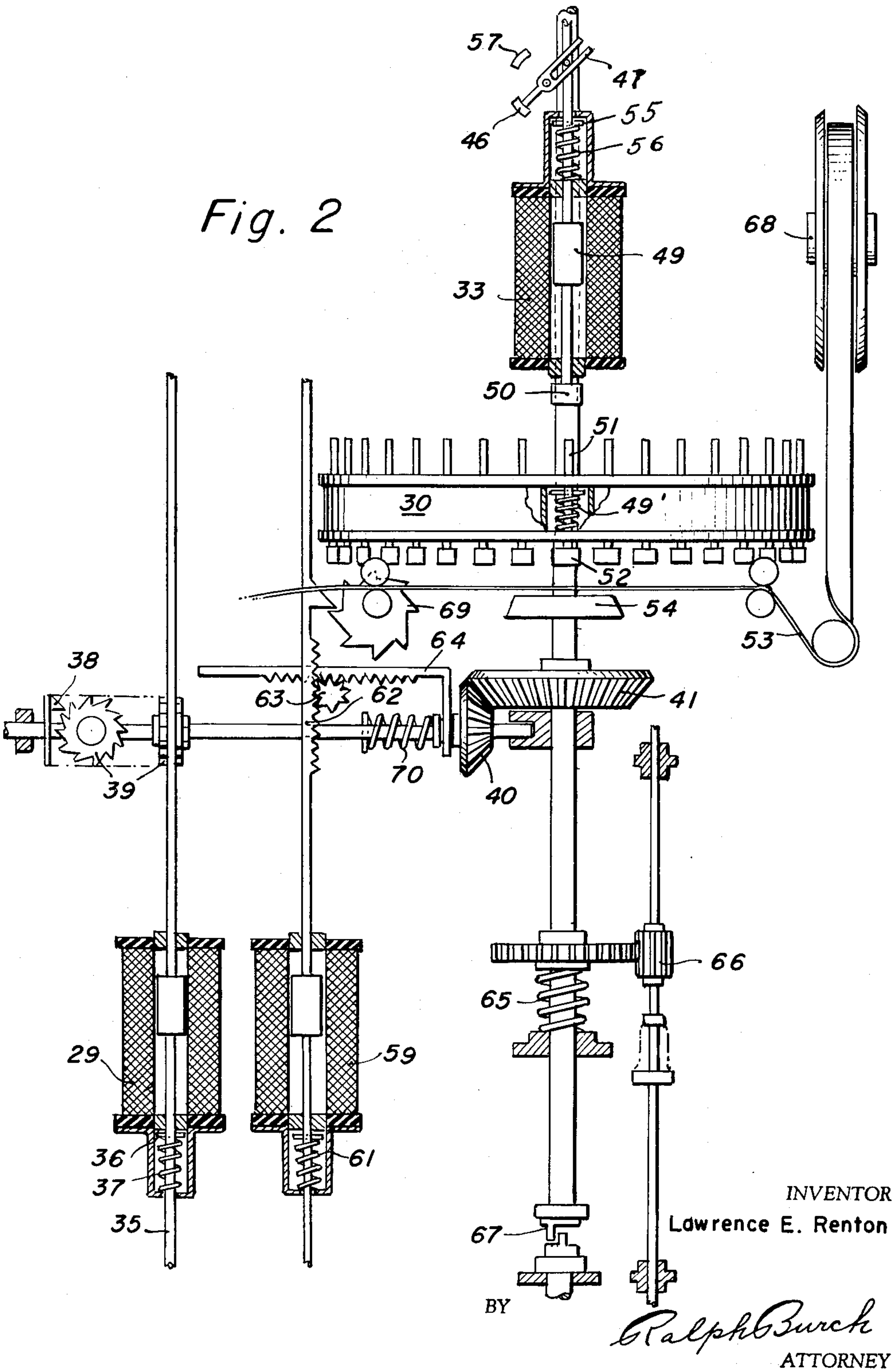

For the purpose of clarifying this disclosure, reference should be had to the accompanying drawings of which Fig. 1, illustrates schematically the representative circuits attendant to the sending and printing unit. Fig. 2, illustrates the printing mechanism, comprising the arrangement of parts.

Similar reference characters are used in both drawings so that cross reference may be had by the use of like characters.

As the description proceeds reference will be made to the term "artificial circuit." The purpose of this is to illustrate the co-operation of the co-ordinating parts without the necessity of a detailed description of things conventional or things brought about purely by mechanical skill. Provision of means is therefore illustrated in Fig. 1, showing the origin of a call and the attendant conventional bell ringing signalling system together with automatic means of causing the printing mechanism to fall in operation. Means of transmission is shown and one form of mechanical sending device depicted as a finger operated dial. The associated circuits are shown illustrating the response of the senders printing mechanism in harmony with the receivers printing mechanism, providing duplex response of printing mechanisms by the activation of a singular sending mechanism.

Because the printing mechanisms are the same at both senders and receivers stations, only one mechanism is illustrated.

Referring now to the drawings and Fig. 1 in particular. Here is shown the artificial circuit X—Y—Z, which is representative of any conventional communication circuit. The stations X and Z represent any two stations of a multiplicity of stations, equipped with the conceived message transmitters and recording printers, capable of being connected through the medium of the co-ordinating station Y. Said station Y having a multiplicity of connections, and means operable of signalling and receiving signals, for the purpose of making available energized communication lines between calling and called stations.

Because the claims to the present disclosure will be restricted to the printer unit per se only that part of the transmitter that is necessary to a clear understanding of the printer's operation will be included.

It is important, during the present description of the printer's operation, that the primary object and spirit of the invention be clearly understood.

It has already been shown, by means of the artificial circuit, that energized communication lines may readily be established between sender and receiver, in any conventional manner. To those trained in the art this is well understood. The sending and printing unit, as conceived, therefore becomes an attachment to said lines of communication.

The primary object of such an attachment is to make possible the leaving of a printed message at any called station that is unattended by an operator. Thus documentary evidence of all incoming calls may be produced at any called station without the necessity of an attendant to that station. It is obvious then that simplicity of operation and economy in construction are the keynotes of such a mechanism.

Having examined, to the best of my knowledge, all existing systems pertaining to the spirit of this invention, the present invention contains many improvements and advantages over the recording systems known.

To those having a knowledge of existing systems pertaining to this art, the improvements and advantages herein will become obvious as the description proceeds.

Of particular note, in this regard, is the automatic means of response causing the printer to fall into operation. The elimination of circuit disruption, by manual interference, of conventional communication circuits and printed circuits. The unnecessary established set time for bell ringing signals. The prevailing means, at a receiving station, necessitating the unscrambling of signals. The necessary means of utilizing different frequencies for transmission in opposite directions. The use of complicated typewriter and telescriber systems.

These, and other obvious conditions, are put forward in substantiation of the ultimate claims to the present invention.

In a general manner, the function of the conceived printer attachment system will now proceed.

Referring to Fig. 1, the sender at station Z wishes to communicate with station X. Contact is made through the artificial circuit, in the sequence Z—Y—X. A combined loop circuit between Y—Z and Y—X is respectively established. The co-ordinating link being provided by conventional means at Y. The energizing of the circuit loops is also provided by conventional means at Y.

The printer may be put into operation either by manual or automatic means in response to the required signal as propagated through the artificial circuit and instigated by the sender. The said required signal is produced by the activation of the receivers circuit loop (16, Fig. 1). Said activation, in this instance, is a combination of two distinct frequencies of alternating current. The one frequency being of a low conventional bell ringing current. The other, of a higher frequency to which the bell does not respond. The purpose of this second, or higher frequency current, is to activate the automatic circuit maker to which further reference will be made as the description proceeds.

With particular reference to Fig. 1, between the conventional bell and the conceived printing mechanism is a double pole double throw switch 11. This switch has three positions, which may be termed, "bell"—"open"—"printer." When the switch is thrown on the "bell" side, the bell is in circuit and the sending and printing mechanism is not operable. When the switch is thrown on the "printer" side, the sending and printing mechanism is in circuit and the bell is not operable.

With further reference to Fig. 1, a double pole single throw switch 12 is between the circuit loop 16 and the automatic circuit maker for the printer mechanism. Switch 12 is in the "open" position when either the bell or the sending mechanism is in operation.

For signal response and manual operation, switch 11 is thrown on the "bell" side; switch 12 is in the "open" position.

When the operator receives a bell signal, i. e. audible signal, and wishes to make the printer responsive to the incoming message, said operator closes switch 12 and opens switch 11. The printer is then ready to receive.

For signal response and automatic operation, switch 11 is in the "open" position and switch 12 is in the "closed" position.

For message sending, switch 11 is thrown on the "printer" side and switch 12 is opened.

It is as well to understand, at this point of the description, a further object of the manual or automatic means of response by the printer mechanism.

If an attendant is at the receiving station, by manual operation documentary evidence of a reciprocal communication may be produced. On the other hand, the automatic means of response allows for the documentation of a transmitted message both at the senders station and at the receivers station, without the necessity of an attendant to the receiving station.

Because the means of differentiation between manual and automatic operation depends primarily on the switching arrangement, which has already been described, the response of the printer by automatic means will continue.

The automatic circuit maker is contained within the printer unit and is designed responsive to a predetermined frequency of multiple frequency signal current.

With reference to Fig. 1, at the instigation of a signal by station Z, and in response to alternating current of a set frequency, through conventional means at Y, the circuit maker at station X is activated.

It will be seen, the primary circuit of the circuit maker now completes the receiving loop, by means of the closed switch 12, inductance 13 and capacitance 14. Switch 11 is open. This is the circuit that carries the signal current.

The secondary circuit of the automatic circuit maker, which is inductively coupled to the primary circuit, is a tuned circuit and is activated when the primary circuit is at resonance.

The said secondary circuit is complete through the winding of relay 15 and the lower left contact of armature. When the circuit is activated, and relay 15 energized, the armature assembly closes the main line loop 16. This loop is completed through the printer mechanism and can be followed in the diagram with reference to conductor 17.

It will be observed that by the closing of the loop circuit, the secondary circuit through relay 15 is broken at the lower left contact of the armature assembly. It will be further observed that the said secondary circuit is remade through the winding of relay 18 and the lower right contact.

The said relay assembly is of slow action and the signal current is cut off before vibration of the armature between the lower contacts.

The printing mechanism is now ready to receive.

By appropriate means, in conjunction with the artificial circuit, the sender at station Z now knows a message may be transmitted to station X.

The communication line now established between sender and receiver is now energized by direct current through conventional means at the co-ordinating station Y of the artificial circuit.

In Fig. 1 only that part of the transmitter necessary to a clear understanding of the printer's operation is illustrated and is represented at 19. For this description, a typical finger operated dial mechanism is made use of. The said mechanism is modified to provide two further sets of make and break contacts 20 and 21. The message to be transmitted is spelled on the dial by inserting the finger in the appropriate hole and turning the finger plate in a clockwise direction until the finger strikes the stop 22. A spring returns the dial to normal and in doing so the contacts 23 are closed and opened a set number of times depending on the character dialed. At the end of each character dialed the return mechanism subsequently closes and opens the contacts 20 and 21 respectively in unison.

By the closing and opening action of contacts 23, the energizing direct current of the communication line is interrupted and by means of the artificial circuit pulsating current is received at the receiving station.

The impulses so received activate a step by step character table, positioning the desired character for printing.

When the contacts 23 are open there is a complete path for the energizing direct current of the communication line through both senders and receivers printers by means of conductor 17 and coil 24 and return of loop.

With the closing of contacts 23 of the senders transmitter, condenser 25 will discharge through resistances 26 and 27. The current through resistance 27 activates relay 28 by means of the inductive coupling of which the primary is connected to ground. The current through resistance 26 passes through the contacts of the impulse springs 23 and is transmitted over the main line.

It will now be understood that the intermittent potential through resistance 27 is instrumental in positioning the type for printing at the senders station while the potential through resistance 26 is instrumental in positioning the type for printing at the called station.

By the activation of relay 28 solenoid 29 is energized by auxiliary current and operates the step by step character table 30, Fig. 2.

It should be noted here that while there is a voltage drop across resistance 26 at the sending station, because of the closed contacts 23, there is no voltage drop across resistance 26 at the called station because contacts 23 are open at this station.

Subsequent to the activity of the impulse springs 23; the make and break contacts 20 and 21 are now closed and opened in unison. Contacts 20 close the primary circuit of relay 31. Relay 31 is therefore energized through the inductive coupling to the primary auxiliary current emanating from terminals 32. Said auxiliary supply being of a conventional nature needs no further explanation.

With the activation of relay 31, solenoid 33 at the senders station is energized and operates the striking hammer for the printing at this station.

Contacts 21 close a circuit in the rectifier section of the auxiliary supply, causing condenser 34 to charge and discharge a predetermined number of times.

By the action of condenser 34 and releasing time of contact springs 21, a pulsating current of known frequency and duration will be released over the main line. By secondary means of a conventional nature, in conjunction with the artificial circuit, this pulsating current activates the striking hammer for the printing at the called station. This will become more obvious as the description proceeds.

In a general way it has been shown; the manual and automatic means of causing the printer mechanisms to fall in operation; the means of type selection; the means of type imprinting; the means of duplex printer response.

A typical operation of the elements and circuits that control the printer will now proceed.

Having due regard for what has gone before; and with reference to Fig. 1, the operator at station Z will transmit the message, "call BC305" to station X of the artificial communication line.

The printing mechanisms are ready to print and the senders transmitter is ready to transmit.

The sender now operates the finger dial mechanism and transmits the message in the following character sequence, "C—A—L—L—( )—B—C—3—0—5."

By the interruption of the direct current line energy these characters are converted to impulses, and for the purpose of this description the number of pulses for each conversion shall be in the respective sequence as: "3—1—12—12—(13)—2—3—29—36—31."

This train of low frequency pulsating current constitutes the activating force of relay 28 and the driving solenoid 29.

The higher frequency pulsating current, released over the main line by the closing of contacts 21 can be represented by the function theta ($\theta$). Theta, therefore, represents a constant, comprising a set number of pulses relative to the time of closure of contacts 21.

The actual train of pulsating current, released over the main line, by the senders transmitter, representative of the exemplifying message, may now be illustrated in the following evaluated train: "3—$\theta$—1—$\theta$—12—$\theta$—13—$\theta$—2—$\theta$—3—$\theta$—29—$\theta$—36—$\theta$—31—$\theta$."

In a general way, it will be understood, theta is the controlling energy activating the striking hammer at the called station remote from the sending station.

For a clearer understanding of this function, it must be understood that the actual pulsating current released by the contacts 21 of the senders transmitter does not in itself reach the circuits of the receivers printer. The energy, represented by theta, does not directly operate the pertinent striking hammer. The direct function of this said energy is to control the activity of a relay in the artificial circuit. The time of operation of said relay is determined by the value of theta. Thus by conventional means at the co-ordinating station Y in the artificial circuit, a surge of alternating current of known frequency is delivered to the printer at the called station and it is this surge of current that brings about the operation of the striking hammer at this station.

The first character, of the message dialed, was the letter "C" (three pulses). By direct response, at the senders station, the associated armature contacts of relay 28 will close and open three successive times. Thus, the driving solenoid 29 will be energized three successive times by a surge of alternating current from the auxiliary supply at terminals 32.

In harmony with this direct response of relay 28 at the senders station, is the accompanying action of relay 28 at the called station.

In this connection it must be noted, by conventional means of the artificial circuit and the co-ordinating station Y, the potentiality of the pulsating current is increased to overcome transmission loss.

Considering now the driving action of solenoid 29. Reference should be had to the drawings Fig. 1 and Fig. 2. Similar reference characters designate corresponding parts in both drawings.

With each surge of alternating current, the plunger armature 35 is driven down. The stop 36, attached to said armature, puts a tension on the spring 37. When the current surge breaks, the action of the tense spring drives the plunger up to its original position. As the plunger is driven down, the pawl 38 engages the ratchet wheel 39, causing said wheel to be rotated a required amount. The distance of travel of the ratchet wheel 39 is controlled so that through suitable gearing 40—41, the character table 30 is rotated a required amount. For the purpose of the present description, one pulse results in one rotary step of the character table. Said table is so constructed that it carries a plurality of characters disposed about the periphery thereof.

It will therefore be seen, the first group of pulses in the descriptive train, namely three, bring into position for printing the character C (ref. 52, Fig. 2).

As the table 30 is rotated, the printing members pass directly over the recording tape 53. When the selected member is in position, directly over platen 54, the table is held stationary. The printing members are attached to pins, and as shown in the diagram Fig. 2, the printing member 52 is attached to the pin 51. Said pins are free to move up and down but are held up in a normal position by a suitable Stop and spring arrangement as at 49'. After being driven down by the striking hammer 50 the pin returns to normal by the action of the said spring.

The character "C," of the message being transmitted, is now ready to be imprinted on the tape. This is effected by the action of the striking hammer.

Considering now the action and controlling circuits of the striking hammer.

The principle of operation controlling relay 31, by direct means, at the senders station has already been described. The attendant auxiliary supply of excitation energy for solenoid 33 will therefore be obvious as emanating from terminals 32.

It has also been explained, how a surge of alternating current of known frequency is transmitted to the printer at the called station.

Examination of Fig. 1, shows two relay assemblies 31 and 42 connected to solenoid 33 by a common conductor 43. Relay 31 is instrumental in supplying excitation energy for solenoid 33 at the transmitting station while relay 42 is instrumental in supplying the excitation energy for solenoid 33 at the called station.

It is important to understand that the stimulus theta, activating relay 42 at the called station, does not interfere with other printer circuits at the transmitting station.

It is also important to understand that the resultant energy of theta, controlling said relay 42, does not interfere with other printer circuits at the called station.

In this connection it will be observed, Fig. 1, that the primary circuit of the automatic circuit maker is now across the main line as well as the primary circuit of relay 42. This is the condition existing at the called station.

On closer examination of Fig. 1, it will be observed that the secondary circuits of the aforesaid primary circuits are tuned circuits. Said tuned circuits are tuned respectively to different frequencies. Therefore the resonant circuit of relay 42 is responsive to the resultant energy of theta whereas the tuned circuit of the circuit maker is not resonant at the same frequency, this circuit is not effected.

The prevailing circuit conditions, at the transmitting station differ from those at the called station due to the fact that switch 12 is in the "open" position at this station. The circuit maker is therefore disconnected and only the primary circuit of relay 42 need be considered.

For obvious reasons this is of minor importance, due to the conductor 43 which is common to relays 31 and 42. However, the intensity of theta does not induct sufficient potential to excite the tuned circuit of relay 42.

With regard to interference of relay 28. Examination of the circuits, Fig. 1, shows the obvious conditions preventing circuit interference which prevail at both calling and called stations. A path of low resistance is offered to the stimulus of theta by means of condenser 44 whereas resistance 45 offers a high resistance to it. Relay 28, therefore, will not be excited.

It will now be obvious that the energy directly activating solenoid 33 is released from the auxiliary alternating current supply, terminals 32, Fig. 1, by means of the relays 31 and 42 respectively.

Referring now to the message under transmission concurrent with this description.

A surge of alternating current will now pass through conductor 43, winding of solenoid 33, contact 46 of transfer switch 47, arm of transfer switch, and conductor 48.

In response to the energizing current now through the winding of solenoid 33, the plunger armature 49, is driven down. Attached to the armature 49, is the striking hammer 50, Fig. 2. The hammer 50, therefore, strikes the pin 51 of the printing member 52 and drives the said member down on the recording tape 53, which is over the platen 54.

The recording tape is composed of a strip of carbon over a strip of plain paper. Ink ribbon can be adapted. When the tape is struck by the printing member, a carbon imprint is left on the plain tape.

The character "C" is now printed on the tape.

The tape must now be moved forward in readiness for the next imprint; also the character table must be returned to normal. This is effected by means of the circuit transfer switch 47 in association with the movement of armature 49.

On the downward movement of the armature 49, the stop 55 puts a tension on the spring 56. By the action of the tense spring the said armature is returned to normal.

Observing the upper end of the armature 49, the circuit transfer switch 47 may be seen. As the armature is driven down it causes the switch arm to move from the lower position 46 to the upper position 57. It is therefore obvious, the circuit of solenoid 33 is broken at the lower commutator 46. A new circuit is made by the contact between the switch arm and the upper commutator 57.

The contacts of relay 31, at the transmitting station, are still closed and the contacts of relay 42, at the receiving station, are still closed. The new circuit, common to both stations, is therefore established by means of conductor 43, winding of relay 58, commutator 47, transfer switch arm and conductor 48. Relay 58 is therefore energized, and the associated armature contacts closed.

Due to the time limit of activating current, the associated armatures of the respective relays 31 and 42 are now released. A surge of auxiliary alternating current is therefore provided for energizing solenoid 59. The circuit supplying this energy is the same at both stations and may be followed with reference to conductor 60, armature contacts of relay 58, winding of solenoid 59 and conductor 48.

The plunger armature of solenoid 59 now responds to this energy. Said plunger armature is driven down and a tension is put on the spring 61, Fig. 2. The armature rack 62 is pulled down causing the pinion 63 to turn in a counterclockwise direction. As the pinion 63 turns, it causes the walking rack 64 to retract the beveled gear 40 from the main driving gear 41. This action releases the character table 30. Because of conventional ratchet and ratchet release means, the position holding of said table is not illustrated. During the process of type positioning, said table 30 wound the return spring 65. It will therefore become obvious how the return movement of the table is effected and controlled by the gear and pinion arrangement shown at 66 and the stop 67.

Synchronized with the gear release is the intermittent tape movement.

The tape 53 is carried on a reel 68 and is fed through rollers over the platen 54. On the downward movement of the armature associated with solenoid 59, a pawl attached to said armature engages the ratchet wheel 69, causing said wheel to turn a required amount and so moving the tape forward ready for the next character to be printed.

The table mechanism is put back in gear and made ready for driving by the return action of the armature associated with solenoid 59.

With the termination of energy activating solenoid 59, the tense spring 61 returns the associated armature back to normal. In the process of doing so, the armature rack 62 turns the pinion 63 in a clockwise direction, causing the walking rack 64 to move forward and engage the beveled gear 40 with the main driving gear 41. A booster spring 70 holds the gears in mesh.

The printing mechanisms are now back in a normal position and ready for the next character to be printed.

The foregoing discussion has illustrated the transmission and printing of the character "C" with the attendant duplex response of printing mechanisms. It would only be superfluous to complete a description of the entire exemplifying message. It is, however, necessary to understand how the spacing of words is effected.

All characters disposed about the periphery of the character table are printed in the manner as herewith described. The spacing of words is effected in a similar manner. The word "space" is displayed on the transmitting dial per se, and represents a single character. As regards the present description, the conversion of this particular character to pulsating current, is designated by thirteen pulses. By the means already described, these thirteen pulses cause the positioning of a blank printing member. The printing members respond as if a character were being printed. The tapes, therefore, remain blank and are moved forward. By dialing the character "space" once or several times in succession determines the amount of spacing between characters or words on the tape.

It will be obvious to those skilled in the art that various modifications of the elements and circuits associated with this invention, herein disclosed, may be resorted to without any departure from the true spirit pertaining thereto, and the limitations of this invention, therefore, shall not be restricted otherwise than are within the scope of the appended claims.

Having thus described my invention, I claim:

1. In a recording apparatus, a rotatable type table, reciprocating type plungers carried by said table, a traveling tape positioned to receive the imprint of the type, a line for transmitting direct and alternating current impulses, electro-magnetic means for rotating said table to selectively locate the type plungers to engage said tape actuated by direct current impulses, a reciprocating hammer for actuating the selected type plunger, a second electro-magnetic means for operating said hammer actuated by alternating current impulses, a third electro-magnetic means for moving said tape actuated by alternating current impulses, and means for sequentially supplying said alternating current impulses first to said electro-magnetic means to operate said hammer and then to said third electro-magnetic means to move said tape.

2. In a recording apparatus, a selective type carrier, electro-magnetic means for operating the type carrier actuated by direct current impulses, a traveling tape adapted to receive the imprint of the selected type, a second electro-magnetic means for moving the selected type into imprint engagement with said tape actuated by alternating current impulses, a third electro-magnetic means for moving said tape actuated by alternating current impulses, and means for sequentially supplying said alternating current impulses first to said electro-magnetic means to operate said hammer and then to said third electro-magnetic means to move said tape.

3. In a recording apparatus, a selective type carrier, electro-magnetic means actuated by direct current impulses to operate the type carrier, a traveling tape adapted to receive the imprint of the selected type, a second electro-magnetic means actuated by alternating current impulses for moving the selected type into imprint engagement with said tape, a third electro-magnetic means for moving said tape actuated by alternating current impulses and means for sequentially applying the alternating current impulses first to said second electro-magnetic means to operate said hammer and then to said third electro-magnetic means to move said tape and including control means in the circuit of said third electro-magnetic means actuated by said second electro-magnetic means.

4. In a recording apparatus, a selective type printing means, an electro-magnetic means for operating said type print means, means for supplying direct current impulses to said electro-magnetic means to control the selection of the type, a traveling tape, means for moving the selected type into imprint engagement with said tape, a second electro-magnetic means for actuating said last-mentioned means, a third electro-magnetic means for actuating said tape, and means for sequentially applying the alternating current impulses first to said second electro-magnetic means to operate said hammer and then to said third electro-magnetic means to move said tape and including control means in the circuit of said third electro-magnetic means actuated by said second electro-magnetic means.

5. In a recording apparatus, a selective type printing member, a driving mechanism for said printing member including a clutch for disconnecting said mechanism, a solenoid for operating said driving mechanism, means for supplying direct current impulses to said solenoid to control the selection of the type, a movable printing tape, mechanism for moving said tape and disengaging the clutch of said driving mechanism, a second solenoid for operating said last mentioned mechanism, mechanism for moving the selected type into engagement with said tape, a third solenoid for operating said last-mentioned mechanism, and means for sequentially applying the alternating current impulses first to said second electro-magnetic means to operate said hammer and then to said third electro-magnetic means to move said tape and including control means in the circuit for said third electro-magnetic means actuated by said second electro-magnetic means.

6. In a recording system, means providing a first frequency, means providing a second frequency, a selective type printing member including movable type elements, a driving mechanism for said printing member including a clutch for disconnecting said mechanism, a solenoid for operating said driving mechanism, a source of direct current pulses, alternating current supply means, direct current pulse-responsive means formed and arranged to connect said solenoid to said supply means responsive to reception of direct current impulses, first frequency responsive means for connecting said direct current pulse-responsive means to said line, a movable printing tape, mechanism for moving a selected type element into imprint engagement with said tape, a second solenoid for operating said last-named mechanism, a second mechanism for moving said tape and disengaging the clutch of said driving mechanism, a third solenoid for operating said tape moving and clutch disengaging mechanism, and second frequency-responsive means for sequentially connecting first said second solenoid and then said third solenoid to said alternating current supply means.

7. The structure of claim 6, and wherein said second frequency-responsive means includes switch means actuated by the movement of the second solenoid and in the circuit of the third solenoid, said switch means interrupting the circuit to the second solenoid and establishing the circuit to the third solenoid.

References Cited in the file of this patent

UNITED STATES PATENTS

| | | |
|---|---|---|
| 316,698 | Van Hoevenbergh | Apr. 28, 1885 |
| 1,452,903 | Bakken | Apr. 24, 1923 |
| 2,186,897 | D'Humy et al. | Jan. 9, 1940 |
| 2,308,306 | Roberts et al. | Jan. 12, 1943 |
| 2,453,269 | Rugh | Nov. 9, 1948 |
| 2,455,617 | Shepard | Dec. 7, 1948 |
| 2,510,273 | Barstow et al. | June 6, 1950 |
| 2,522,462 | Potts | Sept. 12, 1950 |

FOREIGN PATENTS

| | | |
|---|---|---|
| 173,205 | Switzerland | Feb. 16, 1935 |